Patented Aug. 20, 1940

2,212,464

UNITED STATES PATENT OFFICE 2,212,464

DISINFECTANT

Edmund Weidner, Berlin-Charlottenburg, Germany

No Drawing. Application June 10, 1936, Serial No. 84,477. In Germany June 11, 1935

9 Claims. (Cl. 167—14)

This application is a continuation-in-part of my application Serial No. 699,408.

My invention relates to compositions having the character of disinfectants and more especially to acid compositions of this kind which contain a thiocyanate.

It is an object of my invention to render acid preparations of a thiocyanate more stable.

It is another object of my invention to provide thiocyanate-containing compositions of high viscosity, which will not diminish during storage.

It is well known to those skilled in the art that thiocyanates, more especially if mixed with substances capable of liberating thiocyanic acid, display disinfectant properties. Hitherto these properties could however not be utilized in a satisfactory manner, since if a thiocyanate is brought together in aqueous solution with an acid or an acid salt hydrogen sulfide is developed. Furthermore during storage the acid content of such solutions is known to drop gradually. In consequence of their disagreeable odor and their unstability such solutions are not marketable.

I have now found that these drawbacks are avoided if to such preparations are admixed certain metals or metal compounds, for instance copper or copper compounds or molybdenum compounds, for instance molybdic acid. Very small percentages of metals or metal compounds already suffice to stabilise the preparations. I have found that the stabilising effect is brought about in the first place by such metals and metal compounds capable of forming sulfides which are slightly soluble in acids. Silver, mercury, bismuth and lead will act as stabilizers also, but other metals, the sulfides of which are not or only somewhat soluble in acids, and compounds of these metals may serve also for preventing acid solutions of a thiocyanate from developing hydrogen sulfide and from suffering a reduction of its acid content. As further representatives of such metals I may mention the noble metals.

Some of these metals may be considered as catalysts exerting an oxidizing effect. Other catalysts exerting a similar oxidizing effect have been found to be less suitable. Thus for instance titanic acid, vanadic acid, uranium oxide, manganese oxide and ceric oxide when added to acid preparations containing a thiocyanate are not capable of preventing hydrogen sulfide from being developed.

The quantity of the metals or compounds to be added may vary; as a rule quantities as low as 0.1% by weight of the mixture of a thiocyanate and an acid salt have been found to be sufficient.

In practising my invention I admix one or several such stabilizers to an acid solution containing a thiocyanate. Instead of to the solution I may admix the stabilizer to the solid thiocyanate before it is dissolved, or to an acid salt or a solid acid to be mixed with a thiocyanate in dry state or in solution. I may also admix the stabilizer to the dry mixture of a thiocyanate and an acid or an acid salt.

Example 1

If 25 grams sodium thiocyanate and 25 grams potassium bisulfate are dissolved in 450 grams water to yield 500 grams of a 10% solution, already after one or two days hydrogen sulfide starts developing. However, if to such a solution are added from the beginning 0.05 gram crystallized copper sulfate, the solution becomes yellowish to orange colored and even after a long storage no hydrogen sulfide will be traced.

Example 2

If to the solution of Example 1 are added 0.02 gram metallic copper, preferably in the form of a fine powder, a stable, yellowish colored solution is obtained which can be stored without displaying the disagreeable odor characteristic of hydrogen sulfide.

Example 3

If to the same solution are added from 0.025 to 0.050 gram $(Pb(NO_3)_2$, a slight odor of hydrogen sulfide will be observed during the first few days which, however, disappears soon.

Example 4

To 500 grams of a solution corresponding to that of Example 1 I may also add for instance 0.05 gram HgO or 0.05 gram $BiO.NO_3$ or 0.1 gram Ag.

While in the above examples potassium bisulfate has been used, other acid salts or acids, for instance boric acid, may be used. The stabilizer may also be added to preparations containing a thiocyanate and a persulfate and/or the reaction products formed by their interaction. The persulfates of ammonia and the alkali metals and generally all water soluble salts of persulfuric acid may be employed. Besides these compounds the preparations may also contain an alkali metal bisulfite and, if desired, substances acting as catalysts in the reaction between the persulfate and the thiocyanate, such as for instance iron salts or light metal or other compounds. I may add the stabilizers to all these compositions while dissolved or while in dry state or I may add one or several stabilizers to one or several components which shall be combined to yield such a composition.

It is desirable for many purposes to use an acid solution of a thiocyanate having a high viscosity, since highly viscous solutions will better adhere to the parts, to which they are applied and the disinfectant effect will therefore last longer. It is, however, well known to those skilled in the art that the thiocyanogen ion acts towards reducing the viscosity of many solutions and more particularly those of sols and gels. Thus, for instance, solutions of gelatine are liquefied on addition of a thiocyanate.

It is further known that the viscosity of a slime of cream- or oil-like consistency is affected by the presence of acid compounds in such manner that the solution gradually loses its high viscosity and can therefore no longer be used for the purpose mentioned.

For these reasons gelatine cannot be employed for imparting to acid thiocyanate-containing solutions a high viscosity. The same applies to protein solutions. The commercial pectin which is often used for producing highly viscous solutions, will fulfill this purpose at the beginning, if acid thiocyanate solutions are prepared with it; during a few weeks, however, a far reaching liquefication occurs, so that pectin preparations containing acid thiocyanate are not fit for use either.

Mucilages are often employed for the production of solutions of high viscosity. While mucilages prepared from linseeds, quince seeds, fleaseed, saleps, cubebes or the like show the same behaviour as gelatine, I have found that tragacanth will render acid thiocyanate-containing solutions of a high viscosity stable for a long period of time. The viscosity of such tragacanth solutions, which contain a thiocyanate and an acid or an acid salt, has even been found to increase gradually. At the beginning the tragacanth is thinly liquid, but the solution becomes more viscous after some time and the high viscosity will then remain.

In practising my invention I may triturate a certain amount of tragacanth powder with glycerin and introduce this mixture under stirring into an acid solution of thiocyanate.

Example 5

11 parts tragacanth are mixed with 20 parts boric acid and the mixture triturated with 300 parts glycerin of 1.23 sp. gr. The product when dissolved in 404 parts water yields a viscous mass to which is added so much of a concentrated acid solution of a thiocyanate and water that the total weight amounts to 1000 grams and the viscous solution has a content of about 1.8% thiocyanogen ion and a pH-value of about 1.7.

I may add to the highly viscous acid thiocyanate-containing solutions containing for instance tragacanth a persulfate and, if desired, an alkali metal bisulfite and/or one or several of the stabilizers mentioned above.

If a stabilizer of the kind mentioned above is used in connection with a mucilage, for instance in the form of a gel, I prefer to add a considerably greater amount of metals or metal compounds capable of acting as stabilizer. In this case I also prefer to use the free metals in a finely divided form, which then remain uniformly suspended in the gel. I have found the free metals to act in such a case more favorably than their compounds.

Example 6

1 kg. mucilage, 1.25 kgs. sodium thiocyanate and 1.25 kgs. potassium bisulfate are dissolved in water. If 5 to 6 grams copper or silver in finely divided metallic form are added to this solution no hydrogen sulfide will be developed during storage.

All solutions above described are excellently suited for use as disinfectants or plant protectors and their acid titer remains practically constant.

Various changes may be made in the details disclosed in the foregoing specifications without departing from the invention or sacrificing the advantages thereof.

I claim:

1. A disinfectant and plant protective composition of acid reaction comprising a thiocyanate and a substance selected from the metals and metal compounds capable of forming a sulfide which is slightly soluble in acids.

2. A disinfectant and plant protective composition comprising a thiocyanate, an acid and a substance selected from the metals and metal compounds capable of forming a sulfide which is slightly soluble in acids.

3. A disinfectant and plant protective composition comprising a thiocyanate, an acid salt and a substance selected from the metals and metal compounds capable of forming a sulfide which is slightly soluble in acids.

4. A disinfectant and plant protective composition comprising a thiocyanate, a constituent of acid reaction and copper.

5. A disinfectant and plant protective composition comprising a thiocyanate, a constituent of acid reaction and copper sulfate.

6. A disinfectant and plant protective composition comprising a thiocyanate, a constituent of acid reaction and molybdic acid.

7. A disinfectant and plant protective composition of acid reaction comprising a thiocyanate, a persulfate and a substance selected from the metals and metal compounds capable of forming a sulfide which is slightly soluble in acids.

8. A disinfectant and plant protective composition of acid reaction comprising a thiocyanate, a persulfate, an alkali metal bisulfite and a substance selected from the metals and metal compounds capable of forming a sulfide which is slightly soluble in acids.

9. A disinfectant and plant protective composition of acid reaction comprising in aqueous solution tragacanth, a thiocyanate and a substance selected from the metals and metal compounds, capable of forming a sulfide which is slightly soluble in acids.

EDMUND WEIDNER.